Jan. 31, 1956  W. J. GILMORE  2,732,861
FLEXIBLE CONDUITS AND FITTINGS THEREFOR
Filed Sept. 13, 1951
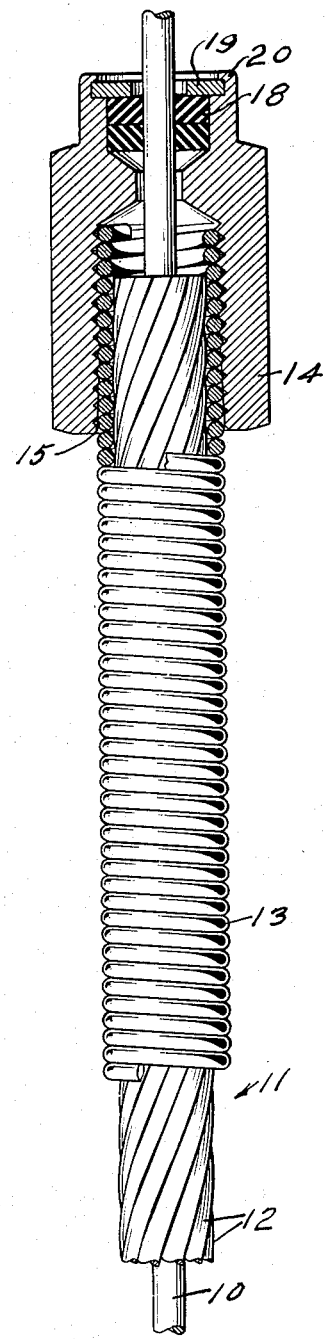
INVENTOR
WILLIAM J. GILMORE
BY Frederick S. Duncan
ATTORNEY United States Patent Office 2,732,861
Patented Jan. 31, 1956

2,732,861

FLEXIBLE CONDUITS AND FITTINGS THEREFOR

William J. Gilmore, Manitou Beach, Mich., assignor to American Chain & Cable Company, Inc., Bridgeport, Conn., a corporation of New York Application September 13, 1951, Serial No. 246,461

4 Claims. (Cl. 138—25)

This invention relates to tubular conduits, such as form the outer members of Bowden wire mechanisms, and particularly it relates to a fitting which may be attached to the end of the conduit without heavy presses or swaging equipment.

Bowden wire mechanisms are often utilized in situations in which the exact length of the conduit is a matter of importance, and, when it becomes necessary to substitute a Bowden wire for another, the replacement unit must have the same length as that of the original. In some factories the length of a Bowden wire cannot be determined before assembly, owing to variation in other units and their placement. The result is that a large number of Bowden wires, differing only in length, must be kept on hand, with consequent complexity of inventory and store-keeping difficulties.

It can be seen that it would be desirable to supply a Bowden wire mechanism which could be cut to length and installed without requiring that the mechanism as supplied by the manufacturer be of an exact length. As the conduit, for various reasons, may require a fitting at each end, means for ready attachment of a fitting on the cut end must be provided. Such fittings as are presently used are secured to the conduit end by rotary swaging, which requires heavy, expensive machinery which justifies its cost only when utilized more or less continuously. Consequently these machines are not a part of the usual equipment at replacement and repair depots. The use of such equipment is however necessary in applying the fitting if the fitting is to be utilized for holding the end of the mechanism under heavy loads, as the material of which the conduit is made is hard and tough, and it is therefore necessary to deform the fitting by flowing it into tight engagement with the conduit material. It is difficult to thread or otherwise deform the conduit of a Bowden wire mechanism, and such deformation weakens the conduit.

With the above considerations in mind, it is a primary object of the present invention to provide an end fitting for a conduit forming the outer member of a Bowden wire mechanism which can be attached to the cut end of the conduit with ordinary tools such as are found at assembly and repair depots.

It is a further object of the present invention to provide an end fitting which provides sufficient reinforcement to prevent concentration of stresses at the point of attachment of the fitting to the conduit.

The single figure in the drawing is of a preferred form of the device selected for illustration, and it is to be understood that the device can take various forms, the scope of the invention being best determined by the appended claims.

The shown Bowden wire mechanism includes an internal member 10, either stranded or solid, as required, and a tubular conduit 11 within which the internal member operates. The method utilized for furnishing a suitable ending for the internal member forms no part of the present invention. The conduit 11 has been illustrated as having an outer layer of wires 12 laid with a coarse pitch, as in strands laid in a stranding machine. In the ordinary manufacture of these conduits, the outer wires are laid around a flexible tubular conduit formed of a flat strip of metal wrapped with adjacent coils close to but not touching each other. The internal member gives the conduit its shape, but the external wires 12 are the stress-transmitting members of the completed conduit.

For various reasons, the outer wires 12 are preformed, that is, they are formed into helices before being laid in position, and, if the assembly is severed with a saw or abrasive disc, the wires 12 tend to remain in place. Such severing can be done by hand, once the exact length of conduit required is known. The fitting can then be attached. As the wires 12 are tough, it is difficult to thread or otherwise deform them for attachment of fastenings suitable for application with hand tools. In addition such threads or other cut deformations weaken the wires. Accordingly, a close-wound spring is utilized to grip the conduit and serve as a thread for the fitting employed. By suitable shaping of the fitting, the grip of the spring on the conduit is increased considerably beyond that possible with an ordinary spring of reasonable length.

The spring 13 is made of suitable spring wire, with an interior diameter less than the exterior diameter of the conduit. Such a spring can be applied to the conduit by rotating it in a direction to open or enlarge the convolutions, as is well understood. In the shown form, the spring is wound left hand, and, consequently, if one end is placed on the conduit, and the free end rotated in a counter-clockwise direction, the spring convolutions will open up and, under axial pressure, while rotation is taking place, the spring will be forced on the conduit. The reason for the selection of a left hand winding and rotation is to prevent displacement of the wires of the conduit which are laid right hand. Counter-clockwise rotation of the wires causes them to more tightly grip the inner tubular member of the conduit and thus, as they are held at each end, they will not be displaced from the inner member of the conduit.

Such a spring, if of sufficient length, can develop a holding power, if threaded into a suitable fitting, to withstand a pull equal to the tensile strength of the wire of which the spring is made. This length is considerable, however, and the resultant hold is less than the tensile strength of the wires of which the conduit is made. In addition to this, the development of such strength requires elastic movement of the spring end, an undesirable feature in a Bowden wire mechanism. Accordingly, a special provision is made in the fitting for increasing the grip of the spring on the conduit.

The fitting 14 utilized has a bore 15 provided with threads of a pitch equal to the pitch of the spring. The particular form of thread utilized is a cylindrical one, with the form mutilated by reaming after formation with a tapered reamer. Such reaming removes considerable of the thread at the mouth of the fitting, but leaves the thread at the inner end of the bore of the fitting substantially untouched.

As the round wire of which the spring is made is of a diameter equal to the pitch of the threads, it is apparent that the tapering mutilation of the threads will permit the spring to expand near the mouth of the bore, and to be constricted near the bottom of the bore. The size of the thread tap and taper reamer are selected to permit ready entry of the spring into the bore, while the innermost part of the bore is capable of preventing the bottoming of the conduit, because of the constriction the unmutilated threads exert on the spring. Between these two extremes, the spring is forced around the conduit with a pressure which is greatest near the end of the conduit, and least at the mouth of the fitting bore.

In practice, assembly of the three components is accomplished by screwing the spring in the fitting sufficiently to stay in place, and then applying the free end of the spring to the end of the conduit. Rotation of the fitting with a wrench, while exerting an axial pressure on the wrench, drives the spring into the fitting until it bottoms, and continued turning and exertion of axial pressure drives the spring and fitting over the end of the conduit until the parts are in the position shown.

Because the taper in the bore of the fitting results in the spring being in effect a tapered thread engaging the wires 12 of the conduit, the spring coils elastically deform the wires and thus have great holding power on the wires of the conduit. It is theoretically possible to develop a holding power which is equal to the force required to shear the convolutions of the spring, or the threads in the bore.

In addition to this effect, the tightly engaged convolutions of the spring cooperate with the threads of the fitting in a little different way. As a convolution of the spring lies in a thread groove in the fitting, axial movement of the fitting relative to the conduit would be accompanied by a climbing of the convolution out of the thread groove. This climbing, of course, is resisted by the conduit, and thus an axial tension attempting to move the fitting relative to the conduit results in a tighter construction of the spring around the body of the conduit.

Although it would appear, from the above description, that the portion of the spring which is bare is not necessary, due to the development of great holding power within the fitting, such is not acually the case. The bare part of the spring serves a useful function in that it acts as a flexible stiffener for the end of the conduit, avoiding concentrated stress which would be present if the fitting were attached to the conduit only by the portion of the spring within the fitting bore. A further additional use of the spring, however, is the function which it serves in securing the fitting in place. As the spring within the bore is in effect tapered, because of the tapering of the bore, it will, if moved slightly axially, become as loose as if the bore were straight and of larger diameter. Under repeated vibrational movement, it is quite possible that the short spring within the bore would be insufficient to hold the fitting in place. On the other hand, the continuation of the spring beyond the end of the fitting makes the assembly at least as secure as an assembly of spring and fitting without the tapered bore. The convolutions of the spring within the bore resist withdrawal from the conduit, because of the frictional resistance of the bare portion of the spring, which brings into play the "climbing" tendency before mentioned, with resultant binding of the spring within the bore.

The selection of a threaded bore and mutilation by means of a tapered reaming operation is by way of illustration of the easiest method of attaining the tapered, threaded bore required. Special tapered taps might well be utilized, but as left-hand tapered taps are not too readily available commercially, the above construction is believed most readily utilizable.

The fitting may, so far as the rest of its structure is concerned, take any form desired. By way of illustration, the fitting has been shown as having a seal formed of a pair of neoprene washers 18, held in place within a bore by a metallic or other rigid washer 19. The rigid washer is in turn held in place by means of a bead 20 rolled over after assembly of the washers into the body of the fitting.

I claim:

1. An assembly of a flexible conduit and end fitting comprising a conduit having an exterior of hard stranded wires, a close-wound helical spring having a normal internal diameter less than the diameter of the exterior of said conduit, said spring surrounding said conduit and elastically gripping the same, a fitting having a tapered, threaded bore, the pitch of the threads thereof being substantially equal to the pitch of the spring, said threaded bore having a diameter in its inner smaller end constricting the spring to prevent entry of the conduit into the convolutions therein, said threaded bore having an effective taper to a diameter sufficient to permit entry of the conduit into convolutions of the spring therein.

2. An assembly of a flexible conduit and end fitting comprising an incompressible conduit having an exterior of hard stranded wires, a close-wound helical spring having a normal internal diameter less than the diameter of the exterior of said conduit, said spring surrounding said conduit and elastically gripping the same, a fitting having a tapered, threaded bore, the pitch of the threads thereof being substantially equal to the pitch of the spring, said threaded bore having at its inner, smaller end a diameter constricting the spring to prevent entry of the conduit into the convolutions therein, said threaded bore having an effective taper to a diameter sufficient to permit entry of the conduit into convolutions of the spring therein, said spring extending onto the conduit beyond the fitting.

3. An assembly of a flexible conduit and end fitting comprising an incompressible conduit having an exterior of hard stranded wires, a close-wound helical spring having a normal internal diameter less than the diameter of the exterior of said conduit, said spring surrounding said conduit and elastically gripping the same, a fitting having a bore with a cylindrical thread of a pitch substantially equal to the pitch of the spring, said thread being mutilated by removal of its crest on a taper from the mouth of the bore to a region spaced therefrom, said mutilated threads being of an effective diameter to permit entry of the spring and conduit into the bore but by constricting the spring preventing entry of the conduit into the convolutions within the bore at the region spaced from the mouth thereof.

4. An end fitting for an incompressible conduit comprising a close-wound helical spring having a normal interior diameter less than the diameter of the conduit, a member having a tapered, threaded bore, the pitch of the threads thereof being substantially equal to the pitch of the spring, said threaded bore having at its inner, smaller end a diameter constricting the spring to prevent entry of the conduit into the convolutions therein, said bore having an effective taper to a diameter sufficient to permit entry of the conduit into convolutions of the spring therein, said spring extending outwardly beyond the member.

References Cited in the file of this patent

UNITED STATES PATENTS

| | | |
|---|---|---|
| 1,951,723 | Burd et al. | Mar. 20, 1934 |
| 1,977,219 | Williams | Oct. 16, 1934 |
| 2,121,624 | Cowles | June 21, 1938 |
| 2,550,669 | Brickman | May 1, 1951 |

FOREIGN PATENTS

| | | |
|---|---|---|
| 747,554 | France | June 20, 1933 |